(12) United States Patent
Ito

(10) Patent No.: US 10,558,032 B2
(45) Date of Patent: Feb. 11, 2020

(54) LIGHT-PROJECTING DEVICE

(71) Applicant: Funai Electric Co., Ltd., Osaka (JP)

(72) Inventor: Tatsuya Ito, Osaka (JP)

(73) Assignee: Funai Electric Co., LTD., Osaka (JP)

( * ) Notice: Subject to any disclaimer, the term of this patent is extended or adjusted under 35 U.S.C. 154(b) by 192 days.

(21) Appl. No.: 15/784,581

(22) Filed: Oct. 16, 2017

(65) Prior Publication Data

US 2018/0149858 A1 May 31, 2018

(30) Foreign Application Priority Data

Nov. 25, 2016 (JP) ................................. 2016-228663

(51) Int. Cl.
| | |
|---|---|
| *G02B 26/08* | (2006.01) |
| *G09G 3/00* | (2006.01) |
| *G09G 3/34* | (2006.01) |
| *H04N 9/31* | (2006.01) |
| *G02B 26/10* | (2006.01) |
| *G02B 27/00* | (2006.01) |
| *G02B 27/01* | (2006.01) |
| *G03B 21/14* | (2006.01) |

(52) U.S. Cl.
CPC ..... *G02B 26/0833* (2013.01); *G02B 26/0841* (2013.01); *G02B 26/101* (2013.01); *G02B 27/0018* (2013.01); *G02B 27/0101* (2013.01); *G03B 21/142* (2013.01); *G09G 3/001* (2013.01); *G09G 3/346* (2013.01); *H04N 9/3135* (2013.01); *H04N 9/3194* (2013.01); *G09G 2310/0232* (2013.01); *G09G 2320/041* (2013.01)

(58) Field of Classification Search
CPC ............ G02B 26/0833; G02B 26/0841; G02B 26/101; G02B 27/0017; G02B 27/0101; G03B 21/142; G09G 3/001; G09G 3/346; G09G 2310/0232; G09G 2320/041; H04N 9/3135; H04N 9/3194
USPC ....................................................... 359/212.1
See application file for complete search history.

(56) References Cited

U.S. PATENT DOCUMENTS

2013/0250388 A1* 9/2013 Nozaki ................ G02B 26/101
359/214.1

FOREIGN PATENT DOCUMENTS

| EP | 3193204 A1 | 7/2017 |
|---|---|---|
| JP | H07-267195 A | 10/1995 |
| JP | H11-073175 A | 3/1999 |

(Continued)

OTHER PUBLICATIONS

Extended European Search Report in counterpart Eropean Application No. 17 19 6010.7 dated Jan. 29, 2018 (11 pages).

(Continued)

*Primary Examiner* — Euncha P Cherry
(74) *Attorney, Agent, or Firm* — Osha Liang LLP

(57) ABSTRACT

A light-projecting device includes a light source that emits a light, and a scanner that performs a first scan of the light in a first direction and a second direction opposed to the first direction, and performs a second scan of the light in a direction orthogonal to the first direction. The scanner performs the second scan while the scanner is swinging in a first angle range when the scanner performs the first scan in the first direction. The scanner performs the second scan while the scanner is swinging in a second angle range that is greater than the first angle range when the scanner performs the first scan in the second direction.

12 Claims, 13 Drawing Sheets

(56) References Cited

FOREIGN PATENT DOCUMENTS

JP 2013-164503 A 8/2013
WO 2016/038884 A1 3/2016

OTHER PUBLICATIONS

Office Action issued in European Application No. 17196010.7, dated Apr. 8, 2019 (41 Pages).

* cited by examiner

LIGHT-PROJECTING DEVICE

BACKGROUND

Technical Field

The present invention generally relates to a light-projecting device.

Related Art

A light-projecting device is known that projects projection lights to a projection surface from a light source such as a semiconductor laser to draw an image. With the light-projecting device, when a light-emitting environment of a temperature of the light source, an ambient temperature, and the like changes, a light quantity of the projection lights also changes and shifts from a target light quantity. Because of this, in a situation of performing APC (auto power control) of the light source in the light-projecting device, the light source cannot be illuminated at the target light quantity unless light output characteristics such as I-L characteristics are sequentially updated. Therefore, there is a need to periodically acquire the I-L characteristics.

However, when acquiring the I-L characteristics, the light source is illuminated at a light quantity near a maximum output. Because of this, when the I-L characteristics are acquired in a situation where a light spot of the projection lights is in a display region of the image, noise arises in the image. Because of this, conventionally, APC of the light source is performed by blocking a projection light projected to a region outside the display region and acquiring I-L characteristics of this projection light.

As one example of the prior art relating to one or more embodiments of the present invention, there is the scanning projection display device of patent literature 1. With this device, among lights from a laser light source, a light where a ratio of a scanning angle to a maximum scanning angle is no less than a predetermined ratio is blocked by a blocking unit. Moreover, so an average temperature of the laser light source is the same in each scanning period, controlled is a current that flows in the laser light source while a light from the laser light source is being blocked (light-blocking period).

Patent Literature 1: Japanese Patent Application Publication No. 2013-164503

However, with the method described above, scanning a projection light in the region outside the display region does not contribute to forming the image displayed in the display region. Therefore, a drawing efficiency of the light-projecting device decreases and a perceived brightness of the image formed in the display region decreases. Moreover, to acquire the I-L characteristics, the projection light must be blocked, but in a situation where the blocking unit is configured by hardware, a blocking range thereof is fixed. When the scanning angle is not constant, for example, when the scanning angle is changed to prioritize light quantity, the blocking unit cannot respond to this change. Therefore, blocking to acquire the I-L characteristics will not be able to be performed.

SUMMARY

One or more embodiments of the present invention provide a light-projecting device that can acquire light output characteristics of a light source while suppressing or preventing a decrease in a drawing efficiency.

A light-projecting device according to one or more embodiments of the present invention may comprise a light source that emits a light, a first detection unit that detects a light quantity of the light emitted from the light source, a controller that controls the light source based on a detection result of the first detection unit, and a scanner that performs a first scan of the light by swinging in a predetermined angle and a second scan orthogonal to the first scan. The scanner is made to be of a configuration that performs the second scan in a first angle in a first direction of the first scan and performs the second scan in a second angle range, which is greater than the first angle, in a second direction, which is an opposite direction of the first direction, in the first scan.

In a light-projecting device according to one or more embodiments of the present invention, the first direction in the first scan is outbound and the second direction in the first scan is inbound.

According to one or more embodiments of the present invention, the second scan in the second direction (inbound) in the first scan is performed in the second angle range, which is greater than the first angle, in the first direction (outbound) of the first scan. Therefore, if an image is formed on a projection surface by the second scan in the first direction (outbound) of the first scan and the light quantity of the light output from the light source is detected when the second scan is performed in an angle that is greater than the first angle and no more than the second angle range in the second direction (inbound) of the first scan, the light quantity of the light output from the light source can be detected without decreasing a drawing efficiency of the image formed on the projection surface or affecting the image with noise or the like. Moreover, light output characteristics of the light source can be acquired using the detected light quantity. Therefore, the light-projecting device can acquire the light output characteristics of the light source while suppressing or preventing a decrease in the drawing efficiency.

Furthermore, a light-projecting device according to one or more embodiments of the present invention is made to be of a configuration where the scanner decreases the second scan from the second angle range to the first angle range in the second direction in the first scan.

According to one or more embodiments of the present invention, the scanning angle of the second scan is decreased to the first angle range before the first scan changes from the second direction to the first direction. Therefore, even if the second scan is being performed at high speed, a range wherein the second scan is performed can be stably decreased with no anomalies. Therefore, the image formed on the projection surface can be optimally displayed without being disturbed.

A light-projecting device according to one or more embodiments of the present invention may comprise is made to be of a configuration where the scanner performs the second scan in a third angle range, which is smaller than the first angle range.

According to one or more embodiments of the present invention, a size of the image formed on the projection surface in the second scan can be decreased.

The light-projecting device according to one or more embodiments of the present invention may comprise is made to be of a configuration where further provided is an input unit that accepts an input, wherein the third angle range is determined based on the input.

According to one or more embodiments of the present invention, the size of the image formed on the projection surface in the second scan can be decreased to a size according to the input.

A light-projecting device according to one or more embodiments of the present invention is made to be of a configuration where the first detection unit detects the light quantity based on the second angle range being no less than a threshold angle range.

According to one or more embodiments of the present invention, the light quantity of the light output from the light source can be detected when the second scan is performed in an angle no less than the threshold angle range. Therefore, by this, the light quantity of the light output from the light source can be detected without affecting the image formed on the projection surface with noise or the like. Moreover, the light output characteristics of the light source can be acquired using the detected light quantity. Therefore, an adverse effect caused by the acquisition of the light output characteristics affecting the image formed on the projection surface can be more reliably prevented.

A light-projecting device one or more embodiments of the present invention is made to be of a configuration where the threshold angle range is made to be an angle where a time when the second angle range is no less than the threshold angle range is longer than a first time and no more than a second time.

According to one or more embodiments of the present invention, the light quantity of the light output from the light source can be detected in a period that is longer than the first time and no more than the second time. Moreover, the light output characteristics of the light source can be acquired using the detected light quantity. Therefore, a period can be ensured of acquiring the light output characteristics of the light source without adversely affecting the display of the image.

A light-projecting device according to one or more embodiments of the present invention is made to be of a configuration where further provided is a second detection unit and a third detection unit that detect the light projected outside a region wherein the second scan is performed in the first angle range on the projection surface, wherein the third detection unit detects the light projected to a different position with regard to the second detection unit and the controller detects the light quantity in a period between the light being detected by the second detection unit and the light being detected by the third detection unit.

According to one or more embodiments of the present invention, it can be sensed that it is a period when a scan in the second direction of the first scan is being performed and the light quantity of the light output from the light source can be detected in this period. Moreover, the light output characteristics of the light source can be acquired using the detected light quantity. Therefore, the adverse effect caused by the acquisition of the light output characteristics affecting the image formed on the projection surface can be more reliably prevented.

A light-projecting device according to one or more embodiments of the present invention is made to be of a configuration (ninth configuration) where further provided is a light-blocking frame that blocks the light projected outside the region wherein the second scan is performed in the first angle range on the projection surface.

According to one or more embodiments of the present invention, projection of the light outside the region where the image is formed on the projection surface can be reliably prevented by the light-blocking frame. Therefore, the adverse effect on the image formed on the projection surface can be reliability prevented and the image can be displayed more suitably.

A light-projecting device according to one or more embodiments of the present invention is made to be of a configuration (tenth configuration) where further provided is a light-blocking frame that blocks the light projected outside the region wherein the second scan is performed in the first angle range on the projection surface, wherein the second detection unit and the third detection unit are each a light-detecting element provided to the light-blocking frame.

According to one or more embodiments of the present invention, projection of the light outside the region wherein the image is formed on the projection surface can be reliably prevented by the light-blocking frame. Moreover, it can be reliably sensed that it is the period when the scan in the second direction of the first scan is being performed.

According to one or more embodiments of the present invention, a light-projecting device includes a light source that emits a light, and a scanner that performs a first scan of the light in a first direction and a second direction opposed to the first direction, and performs a second scan of the light in a direction orthogonal to the first direction. The scanner performs the second scan while the scanner is swinging in a first angle range when the scanner performs the first scan in the first direction. The scanner performs the second scan while the scanner is swinging in a second angle range that is greater than the first angle range when the scanner performs the first scan in the second direction.

According to one or more embodiments of the present invention, a light-projecting device can acquire light output characteristics of a light source while suppressing or preventing a decrease in a drawing efficiency can be provided.

DETAILED DESCRIPTION

Embodiments of the present invention will be described below with reference to the drawings. In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. In one or more embodiments of the present invention, an example of a head-up display device 100 for a vehicle 200 will be explained below. The head-up display device 100 is referred to hereinbelow as a HUD (head-up display) device 100. Moreover, a horizontal direction of a projection surface 111 to which laser lights 300 are projected and a direction corresponding to the horizontal direction of the projection surface 111 are simply referred to as "horizontal direction" and labeled with the reference sign "X." Moreover, a vertical direction of the projection surface 111 and a direction corresponding to the vertical direction of the projection surface 111 are simply referred to as "vertical direction" and labeled with the reference sign "Y."

(First Embodiment)

Figure 1:
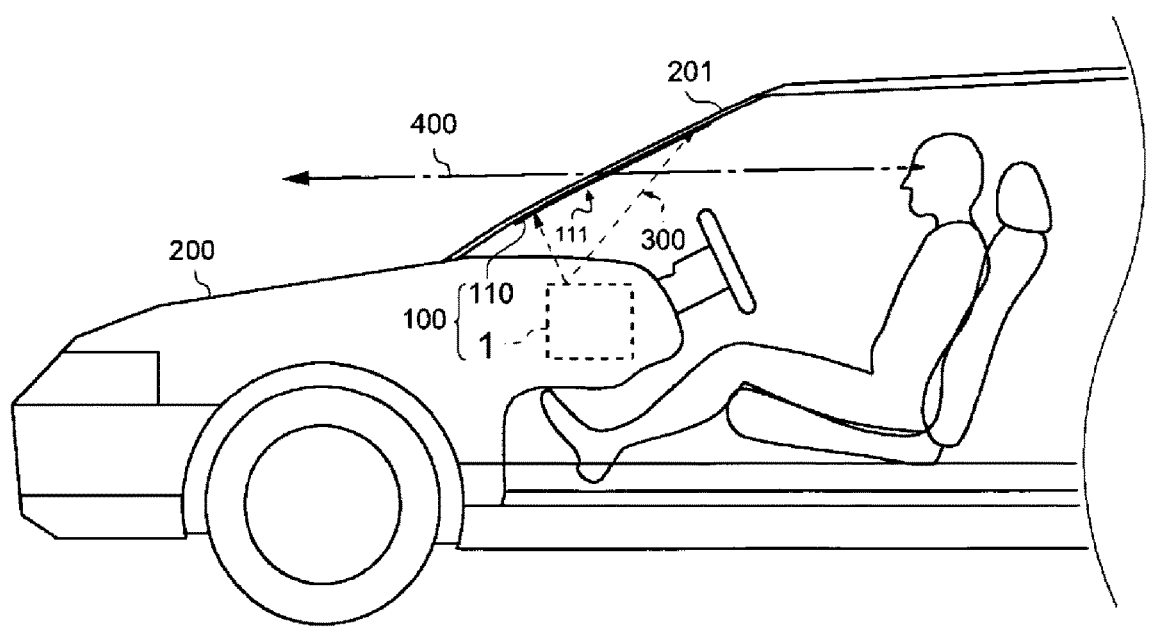
FIG. 1 is a schematic view of a HUD device according to one or more embodiments of the present invention.

FIG. 1 is a schematic view of the HUD device 100. The HUD device 100 according to one or more embodiments of the present invention is onboard the vehicle 200. The HUD device 100 includes a projector unit 1 and a combiner 110. The projector unit 1 is a light-projecting device that projects the laser lights 300 from an optical unit to a windshield 201 of the vehicle 200. By further scanning the projected laser lights 300, the projector unit 1 displays a projection image superimposed in a field of view of a user. In FIG. 1, the dash-dot arrow 400 illustrates a line of sight of the user, who is seated in a driver's seat of the vehicle 200. Moreover, the HUD device 100 is not limited to being onboard the vehicle 200 and may also be onboard another vehicle (such as an aircraft).

As illustrated in FIG. 1, the combiner 110 is affixed to an inner surface of the windshield 201. This combiner 110 is a projection target member for displaying the projection image of the projector unit 1 in the field of view of the user and is formed using a semitransparent reflective material such as a half-mirror. By the scanned laser lights 300 being projected to the combiner 110 from the projector unit 1, a virtual image is formed on the projection surface 111, which is on the combiner 110. Because of this, the user viewing forward of the vehicle 200 (that is, in a direction of the line of sight 400) can simultaneously view an image of the external world forward of the vehicle 200 and the projection image projected from the projector unit 1.

Figure 2:
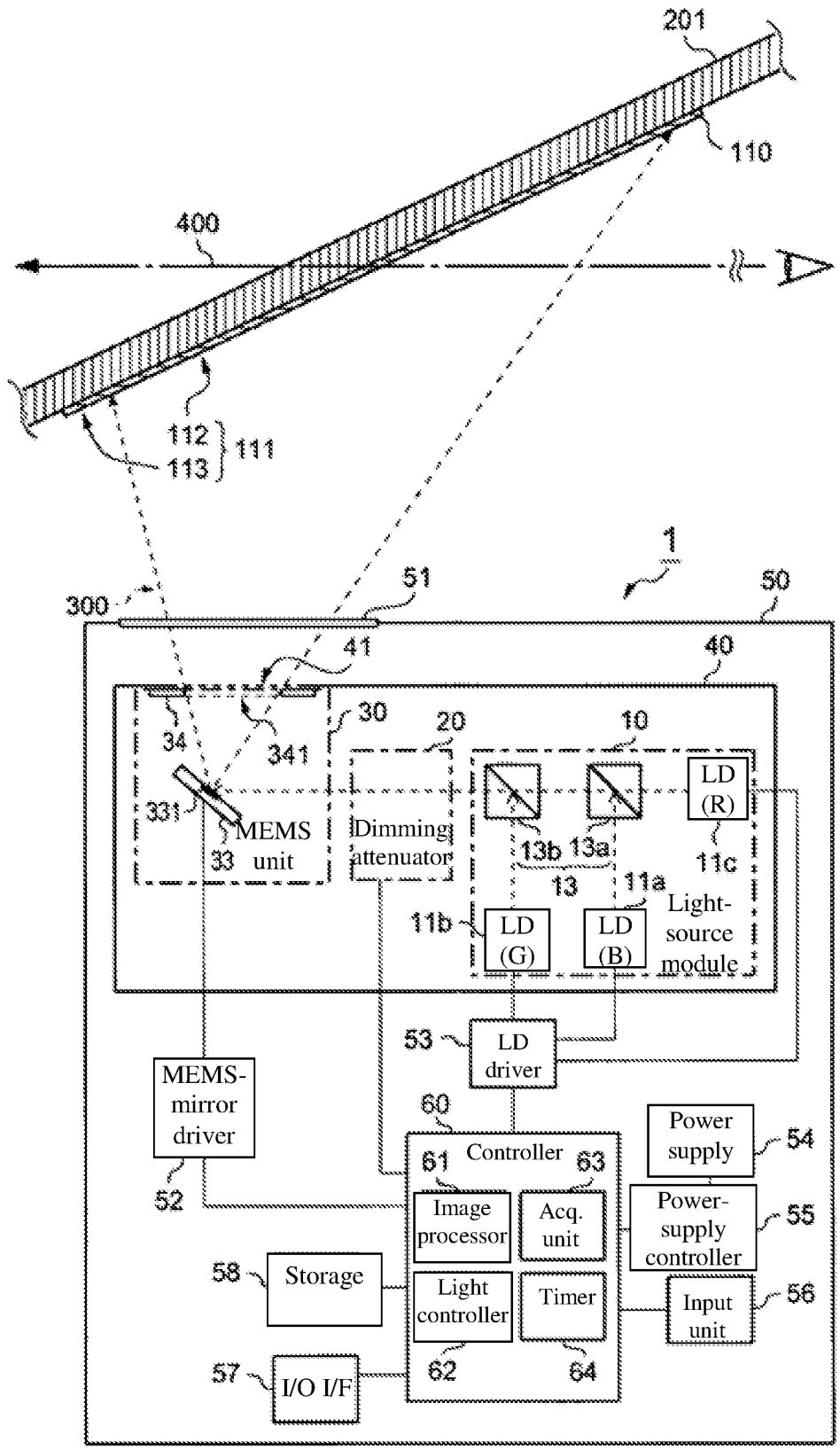
FIG. 2 is a block diagram illustrating a configuration example of a projector unit according to one or more embodiments of the present invention.
Figure 3:
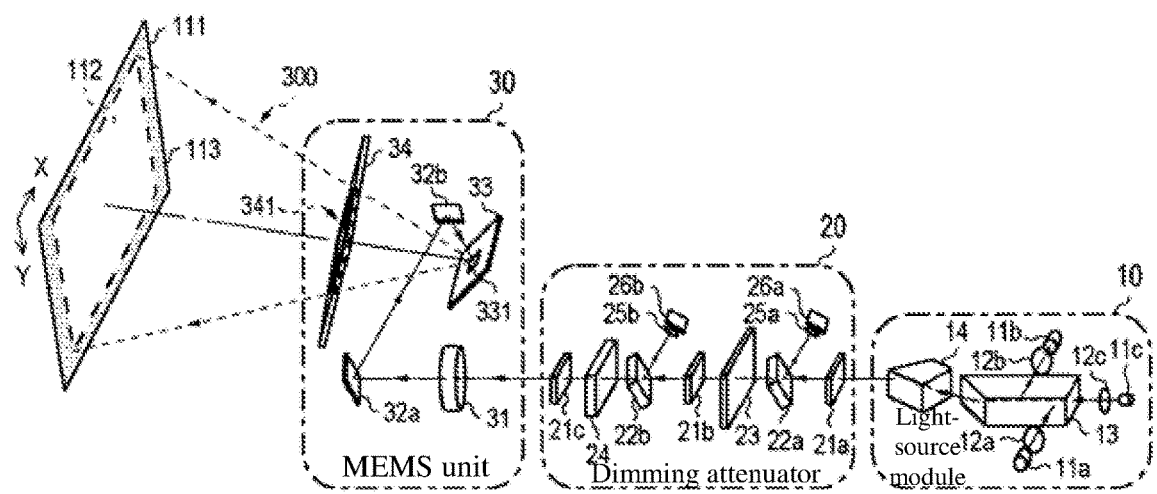
FIG. 3 is a conceptual diagram illustrating a configuration example of an optical unit according to one or more embodiments of the present invention.

Next, the projector unit 1 is described. FIG. 2 is a block diagram illustrating a configuration example of the projector unit 1. FIG. 3 is a conceptual diagram illustrating a configuration example of an optical unit. The projector unit 1 includes the optical unit and an optical-system housing 40.

The optical-system housing 40 houses the optical unit therein. Moreover, the optical-system housing 40 is formed with an opening 41. The laser lights 300 emitted from the optical unit are emitted outside the optical-system housing 40 via the opening 41. The opening 41 is formed using, for example, a glass or a transparent resin material.

The optical unit is configured by a light-source module 10, a dimming attenuator 20, and a MEMS unit 30.

The light-source module 10 has laser diodes 11a to 11c; collimating lenses 12a to 12c; a light-synthesizing member 13 consisting of beam splitters 13a, 13b; and a prism 14. The laser diodes 11a to 11c are respectively referred to hereinbelow as LDs (laser diodes) 11a to 11c.

The LDs 11a to 11c are one example of a light source of the laser lights 300 and, based on light output signals output from an LED driver 53 that is described below, output laser lights of light quantities according to these light output signals. In one or more embodiments of the present invention, the light output signals output to each LD 11a to 11c are each a drive current supplied to each LD 11a to 11c. The LD 11a is a semiconductor laser element that emits a blue laser light. The LD 11b is a semiconductor laser element that emits a green laser light. The LD 11c is a semiconductor laser element that emits a red laser light. The light-synthesizing member 13 outputs the laser lights 300, which are a synthesis of the laser lights of each color output from the LDs 11a to 11c, to the prism 14.

The blue laser light emitted from the LD 11a is converted into a parallel light by the collimating lens 12a, reflected by the beam splitter 13a, and output to the dimming attenuator 20 via the beam splitter 13b and the prism 14. The green laser light emitted from the LD 11b is converted into a parallel light by the collimating lens 12b, reflected by the beam splitter 13b, and output to the dimming attenuator 20 via the prism 14. The red laser light emitted from the LD 11c is converted into a parallel light by the collimating lens 12c and output to the dimming attenuator 20 via the beam splitters 13a, 13b and the prism 14.

The dimming attenuator 20 has polarizing filters 21a, 21b, 21c; half-mirrors 22a, 22b; a liquid-crystal element 23; a half-wave plate 24; light-quantity filters 25a, 25b; and Optical Electrical Integrated Circuits (OEICs) 26a, 26b. The OEICs 26a, 26b are light-receiving ICs (or detection units) configured including a photodiode and detect the laser lights 300 output from the light-source module 10, particularly detecting light quantities of each color of laser light 300 (for example, RGB) included in the laser lights 300.

Of the laser lights 300 emitted from the light-source module 10, laser lights 300 whose polarization direction is the vertical direction pass through the polarizing filter 21a. A portion of the laser lights 300 that pass through the polarizing filter 21a (for example, 99%) passes through the half-mirror 22a, and a remaining portion (for example, 1%) is reflected by the half-mirror 22a. The light quantities at each wavelength of the laser lights 300 reflected by the half-mirror 22a decrease at the light-quantity filter 25a and are detected at the OEIC 26a. A detection result of the OEIC 26a is output to a controller 60. Meanwhile, at the liquid-crystal element 23, the polarization direction of the laser lights 300 that pass through the half-mirror 22a is rotated 90°.

Of the laser lights 300 that pass through the liquid-crystal element 23, laser lights 300 whose polarization direction is the horizontal direction pass through the polarizing filter 21b. A portion of the laser lights 300 that pass through the polarizing filter 21b (for example, 99%) passes through the half-mirror 22b, and a remaining portion (for example, 1%) is reflected by the half-mirror 22b. The light quantities at each wavelength of the laser lights 300 reflected by the half-mirror 22b decrease at the light-quantity filter 25b and are detected at the OEIC 26b. A detection result of the OEIC 26b is output to the controller 60. Meanwhile, at the half-wave plate 24, the polarization direction of the laser lights 300 that pass through the half-mirror 22a is rotated 45°. Of the laser lights 300 that pass through the half-wave plate 24, laser lights 300 whose polarization direction is 45° pass through the polarizing filter 21c and are output to the MEMS unit 30.

The MEMS unit 30 has a condensing lens 31; mirrors 32a, 32b; a biaxial MEMS mirror device 33; and a light-blocking frame 34 formed with an opening 341. In one or more embodiments of the present invention, the light-blocking frame 34 is provided on an inner side of an edge portion of the opening 41 of the optical-system housing 40 along this edge portion of the opening 41; however, the light-blocking frame 34 is not limited to this example and may be provided, for example, on an inner side of an edge portion of a light emission port 51 of a main-body housing 50 that is described below along this edge portion of the light emission port 51.

The laser lights 300 output from the dimming attenuator 20 are converged by the condensing lens 31; reflected in order by the mirrors 32a, 32b; and made incident to the biaxial MEMS mirror device 33. The biaxial MEMS mirror device 33 has a swingable mirror portion 331 (light-reflector). The mirror portion 331 is a light-projecting member that reflects and projects to the projection surface 111 the laser lights 300 made incident from a condensing lens 14 via the mirrors 32a, 32b. The laser lights 300 projected from the mirror portion 331 are emitted outside the projector unit 1 via the opening 41 of the optical-system housing 40 and the light emission port 51 and projected to the projection surface 111 on the combiner 110.

Here, the laser lights 300 projected to the projection surface 111 are restricted by the light-blocking frame 34. The light-blocking frame 34 is a light-blocking portion that blocks the laser lights 300 projected outside a display region 112 by the mirror portion 331. Specifically, of the laser lights 300 projected from the mirror portion 331, laser lights 300 incident to the opening 341 of the light-blocking frame 34 are projected to the display region 112 of the projection surface 111 via this opening 341. Meanwhile, the laser lights 300 projected to the light-blocking frame 34 are projected to regions 113 outside the display region 112 on the projection surface 111, blocked at the light-blocking frame 34, and not projected to the projection surface 111. The regions 113 outside the display region 112 are regions of the projection surface 111 to which the laser lights 300 are not projected and are referred to hereinbelow as light-blocking regions 113. In the horizontal direction X, a width of the display region 112 is made to be, for example, about 80% of a width of the projection surface 111 and a width of each light-blocking region 113 is made to be, for example, about 10% of the width of the projection surface 111.

Furthermore, the biaxial MEMS mirror device 33 functions as a scanner that scans the laser lights 300 on the projection surface 111 and causes the mirror portion 331 to operate reciprocatingly, in a predetermined angle range, between a predetermined direction on the projection surface 111 and a direction intersecting this predetermined direction. In one or more embodiments of the present invention, by swinging a mirror portion 311 in the horizontal direction X and the vertical direction Y of the projection surface 111, the biaxial MEMS mirror device 33 can reciprocatingly scan the laser lights 300 in the horizontal direction X and the vertical direction Y. Hereinbelow, the mirror portion 331 performing the reciprocating operation in one direction (for example, the horizontal direction X or the vertical direction Y) in the predetermined angle range may be expressed as "swinging." Moreover, a configuration whereby the laser lights 300 are reciprocatingly scanned is detailed below.

In one or more embodiments of the present invention, the laser lights 300 are scanned using the biaxial MEMS mirror device 33; however, the laser lights 300 are not limited to this example and may be scanned using a MEMS mirror device for vertical scanning and a MEMS mirror device for horizontal scanning. In other words, the MEMS unit 30 may have instead of the biaxial MEMS mirror device 33 a MEMS mirror device having a mirror portion that can swing in the vertical direction Y of the projection surface 111 and a MEMS mirror device having a mirror portion that can swing in the horizontal direction X of the projection surface 111.

Next, a remaining configuration of the projector unit 1 is described referring once again to FIG. 2. The projector unit 1 further includes the main-body housing 50, a MEMS mirror driver 52, an LD driver 53, a power supply 54, a power-supply controller 55, an input unit 56, an input/output I/F 57, a storage unit 58, and the controller 60.

The main-body housing 50 houses the optical-system housing 40 that houses the optical unit, the MEMS mirror driver 52, the LD driver 53, the power supply 54, the power-supply controller 55, the input unit 56, the input/output I/F 57, the storage unit 58, and the controller 60. Moreover, the main-body housing 50 is formed with the light emission port 51. The laser lights 300 that pass through the opening 41 of the optical-system housing 40 further pass through the light emission port 51 and are emitted to the combiner 110. Note that this light emission port 51 may be an opening but is formed using, for example, a glass or a transparent resin material. By this, intrusion of dust, moisture (for example, water drops, air including moisture), and the like into the main-body housing 50 can be prevented.

The MEMS mirror driver 52 is a scanning controller that controls the biaxial MEMS mirror device 33 based on a control signal input from the controller 60. For example, the MEMS mirror driver 52 controls swinging of the mirror portion 331 in the horizontal direction X according to a horizontal synchronization signal output from the controller 60 and controls swinging of the mirror portion 331 in the vertical direction Y according to a vertical synchronization signal output from the controller 60.

The LD driver 53 is a light-source drive unit that drives each LD 11a to 11c. The LD driver 53 generates the light output signals based on light control signals output from the controller 60 and outputs these light output signals to the respective LDs 11a to 11c. Specifically, the LD driver 53 outputs to the respective LDs 11a to 11c drive currents that are based on the light control signals.

The power supply 54 is a power supply unit that receives supply of power from a power source such as a storage battery (not illustrated) of the vehicle 200. The power-supply controller 55 converts power supplied from the power supply 54 into a predetermined voltage value and current value according to each component of the projector unit 1 and supplies the converted power to each component. The input unit 56 is an input unit that accepts an operation input of the user. The input/output I/F 57 is a communication interface for wired communication or wireless communication with an external device.

The storage unit 58 is a nonvolatile storage medium and stores, for example, programs, control information, and the like used at each component of the projector unit 1. Moreover, the storage unit 58 also stores image information to be projected to the projection surface 111, light output characteristic information of the LDs 11a to 11c, light output table information relating to the LDs 11a to 11c, and the like. Indicated in the light output table information are light-output and drive-current values of the LDs 11a to 11c corresponding to detection values of the light quantities at each wavelength detected by the OEICs 26a, 26b.

The controller 60 is a controller that controls each component of the projector unit 1 using the programs, the control information, and the like stored in the storage unit 58. As illustrated in FIG. 2, the controller 60 has an image processing unit 61, a light controller 62, an acquisition unit 63, and a timer 64.

The image processing unit 61 generates the image information, which is based on the programs stored in the storage unit 58, information input from the input/output I/F 57, the information stored in the storage unit 58, and the like. Moreover, the image processing unit 61 converts the generated image information into image data of three colors, red (R), green (G), and blue (B). The converted image data of three colors are output to the light controller 62.

Figure 4:
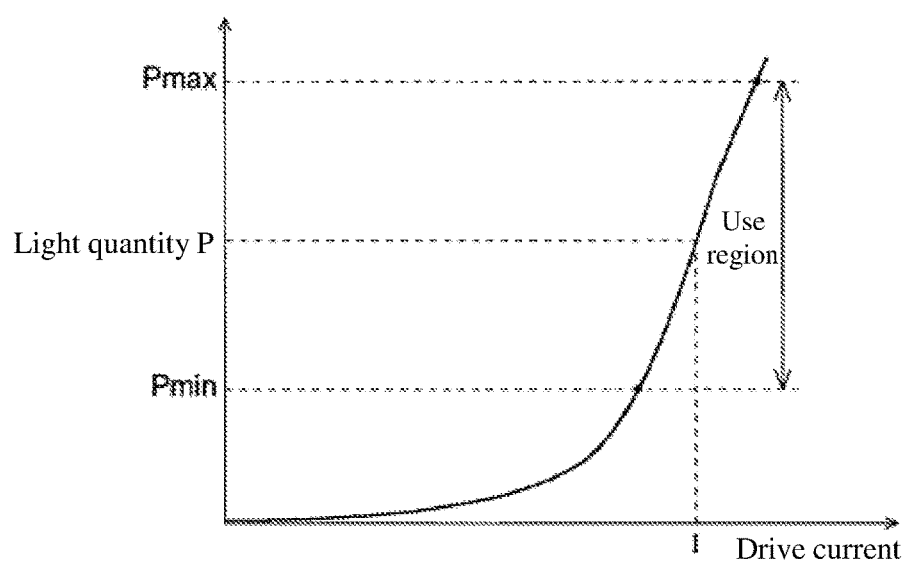
FIG. 4 is a graph illustrating one example of light output characteristics of an LD according to one or more embodiments of the present invention.

The light controller 62 controls the LDs 11a to 11c by outputting the light output signals from the LD driver 53 to each LD 11a to 11c based on the detection results of the OEICs 26a, 26b. Specifically, the light controller 62 generates the respective light control signals of the LDs 11a to 11c based on the image data of the three colors. For example, with the LD 11a, the light controller 62 determines a light output P of the LD 11a based on the image data for blue (B) and determines a drive current I of the LD 11a based on the light output characteristic information of the LD 11a (for example, see FIG. 4). Then, the light controller 62 generates and outputs to the LD driver 53 a light control signal indicating the drive current I. Because similar processes are performed with the other LDs 11b, 11c, description thereof is omitted.

The acquisition unit 63 acquires the respective light output characteristics of the LDs 11a to 11c based on the light output signals the light controller 62 outputs to each LD 11a to 11c and the detection results of the OEICs 26a, 26b. Note that an acquisition method of the respective light output characteristics is not particularly limited. For example, the LD 11a is illuminated a plurality of times at different predetermined light quantities. Then, based on light output control signals output to the LD 11a at each illumination and the light quantities of a blue laser light 300 detected by the OEIC 26a or the OEIC 26b at each illumination, a light output characteristic curve of the LD 11a such as that in FIG. 4 can be created. Respective light output characteristic curves of the LDs 11b, 11c can be created similarly.

The timer 64 is a timekeeping unit that performs timekeeping of, for example, an elapsed time from a current time or a predetermined time.

Next, the configuration whereby the laser lights 300 are reciprocatingly scanned is specifically described by giving a comparative example and an example.

COMPARATIVE EXAMPLE

Figure 5A:
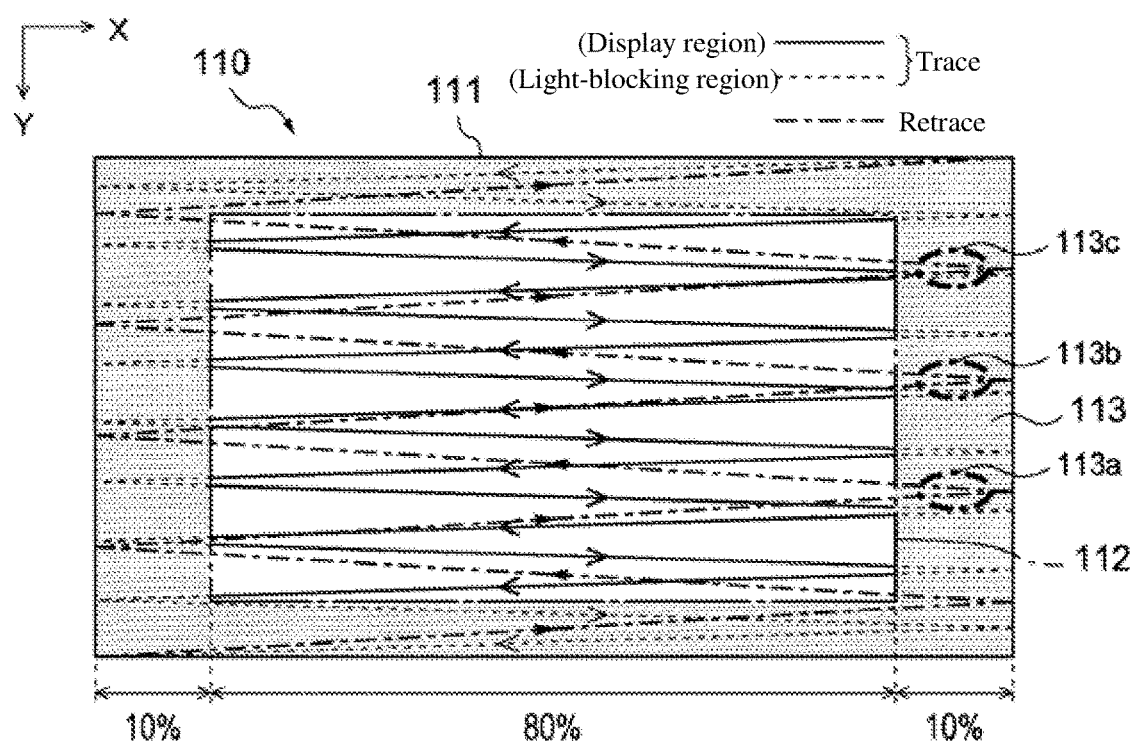
FIG. 5A is a conceptual diagram illustrating reciprocating scanning of laser lights in a comparative example.

First, the comparative example is described. FIG. 5A is a conceptual diagram illustrating reciprocating scanning of the laser lights 300 in the comparative example. Moreover, FIG. 5B is a graph illustrating horizontal driving and vertical driving of the mirror portion 331 in the comparative example.

The solid line in FIG. 5A illustrates a trajectory of a light spot of the laser lights 300 scanned in the display region 112 by being projected from the mirror portion 331 in a tracing period, wherein the image is displayed in the display region 112. The dashed line in FIG. 5A illustrates a trajectory of a virtual light spot of the laser lights 300 that would be scanned in the light-blocking regions 113 in a situation where it is supposed that the laser lights 300 are projected from the mirror portion 331 to the light-blocking regions 113 of the projection surface 111 in the tracing period. The dash-dot line in FIG. 5A illustrates a trajectory of a virtual light spot of the laser light 300 that would be scanned on the projection surface 111 in a situation where it is supposed that the laser lights 300 are projected from the mirror portion 331 to the projection surface 111 in a retracing period, wherein the image is not displayed. Here, the retracing period is a return period required for the virtual light spot to return to an initial position. Moreover, in FIG. 5B, the solid-line waveform illustrates the horizontal driving (that is, swinging in the horizontal direction X) of the mirror portion 331 and the dashed-line waveform illustrates the vertical driving (that is, swinging in the vertical direction Y) of the mirror portion 331. Moreover, a vertical width of the solid-line waveform indicates an angle range θh of the horizontal driving of the mirror portion 331 and a vertical width of the dashed-line waveform indicates an angle range θv of the vertical driving of the mirror portion 331. Note that what is described above is similarly the case in the other FIGS. 6A to 11 that are described below.

Figure 5B:
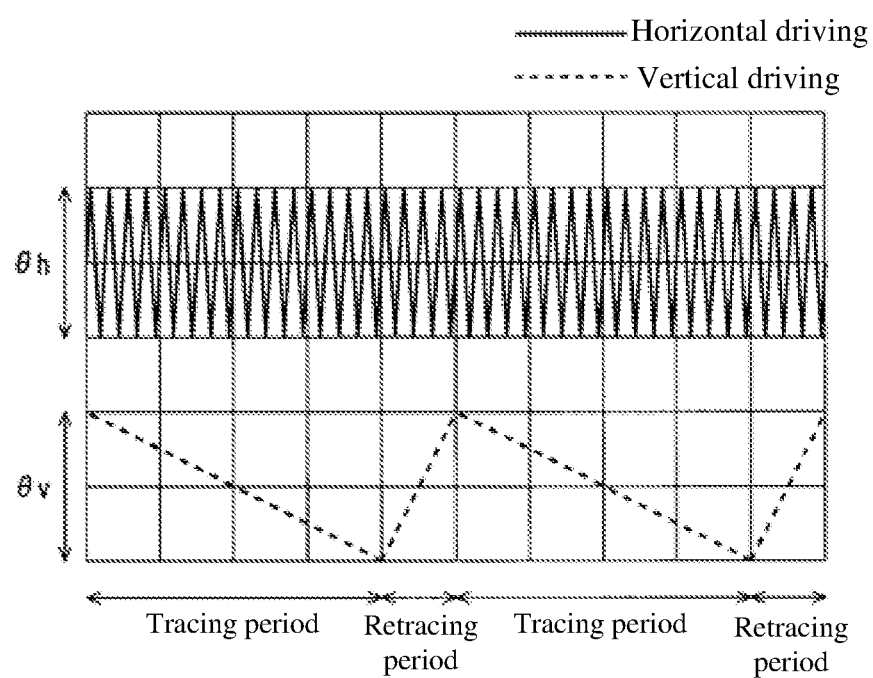
FIG. 5B is a graph illustrating horizontal driving and vertical driving of a mirror portion in the comparative example.

As illustrated in FIG. 5B, in the comparative example, both the angle range θv of the swinging in the vertical direction Y of the mirror portion 331 and the angle range θh of the swinging in the horizontal direction X of the mirror portion 331 are constant. As illustrated in FIGS. 5A and 5B, by the mirror portion 331 swinging (being reciprocatingly operated) in the vertical direction Y in the angle range θv, the laser lights 300 are reciprocatingly scanned in the vertical direction Y on the projection surface 111. Moreover, by the mirror portion 331 swinging (being reciprocatingly operated) in the horizontal direction X in the angle range θh in a period where the laser lights 300 are being scanned downward or upward in the vertical direction Y, the laser lights 300 are reciprocatingly scanned in the horizontal direction X on the projection surface 111. That is, the scanning of the laser lights 300 alternatingly performs a zigzag reciprocating operation heading downward in the vertical direction Y and a zigzag reciprocating operation heading upward in the vertical direction Y. Note that hereinbelow, a period when the laser lights 300 are being scanned downward in the vertical direction Y and reciprocatingly scanned in a zigzag in the horizontal direction X is referred to as the tracing period. Moreover, a period when the laser lights 300 are being scanned upward in the vertical direction Y and reciprocatingly scanned in a zigzag in the horizontal direction X is referred to as the retracing period.

In the tracing period of the comparative example, the mirror portion 331 is tilted downward in the vertical direction Y in the angle range θv and swings in the horizontal direction X in the angle range θh. The laser lights 300 reflected by the mirror portion 331 are reciprocatingly scanned in a zigzag downward in the vertical direction Y of the projection surface 111. At this time, the laser lights 300 projected to the light-blocking regions 113 are blocked by the light-blocking frame 34. Therefore, on the projection surface 111, in the display region 112, the image is formed by the light spot of the laser lights 300 being reciprocatingly scanned in a zigzag downward in the vertical direction Y. Meanwhile, in the light-blocking regions 113, the laser lights 300 are not projected; as in the dashed line in FIG. 5A, the virtual light spot is reciprocatingly scanned in a zigzag downward in the vertical direction Y.

In the retracing period of the comparative example, the mirror portion 331 is tilted upward in the vertical direction Y in the angle range θv and swings in the horizontal direction X in the angle range θh. In the retracing period, the laser lights 300 are not output from the LDs 11a to 11c; therefore, as in the dash-dot line in FIG. 5A, the virtual light spot is reciprocatingly scanned in a zigzag upward in the vertical direction Y. However, in a situation where the virtual light spot is in a light-blocking region 113, each LD 11a to 11c is illuminated in order at predetermined light outputs and the light output characteristics are acquired by the acquisition unit 63. For example, in FIG. 5A, when the virtual light spot is positioned in a region 113a, the LD 11a is illuminated and the light output characteristics of the LD 11a are acquired. Moreover, when the virtual light spot is positioned in a region 113b, the LD 11b is illuminated and the light output characteristics of the LD 11b are acquired. Moreover, when the virtual light spot is positioned in a region 113c, the LD 11c is illuminated and the light output characteristics of the LD 11c are acquired.

EXAMPLE

Figure 6A:
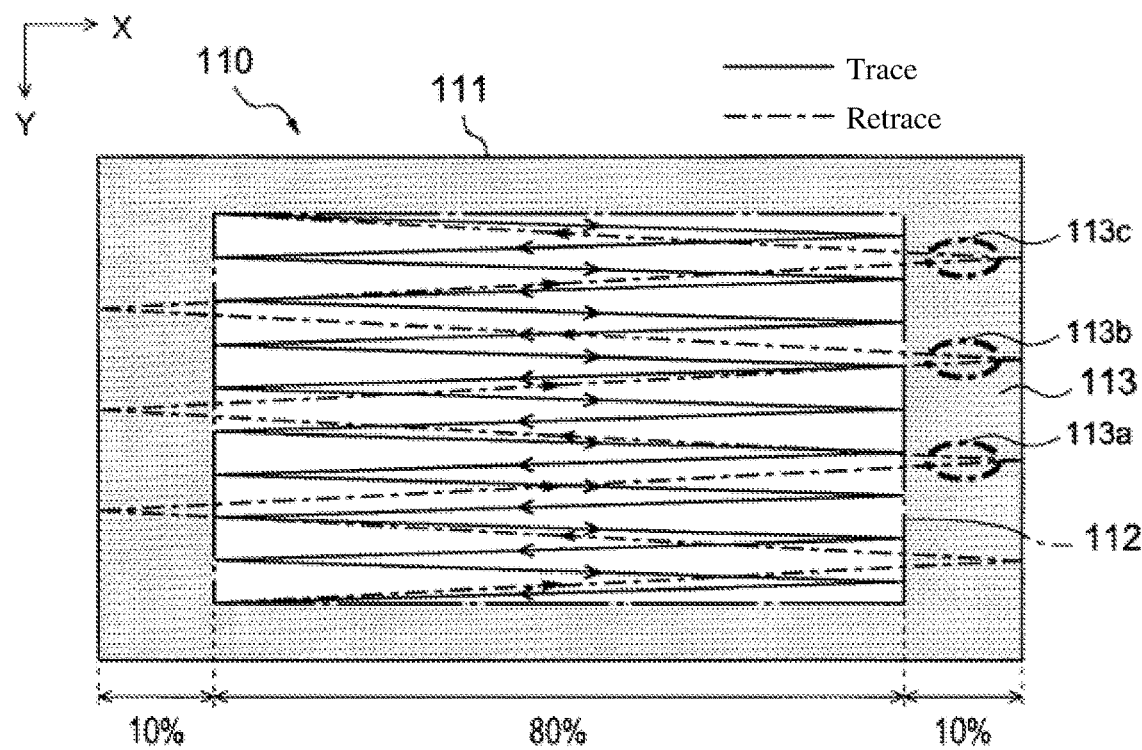
FIG. 6A is a conceptual diagram illustrating reciprocating scanning of the laser lights according to a first embodiment of the present invention.
Figure 6B:
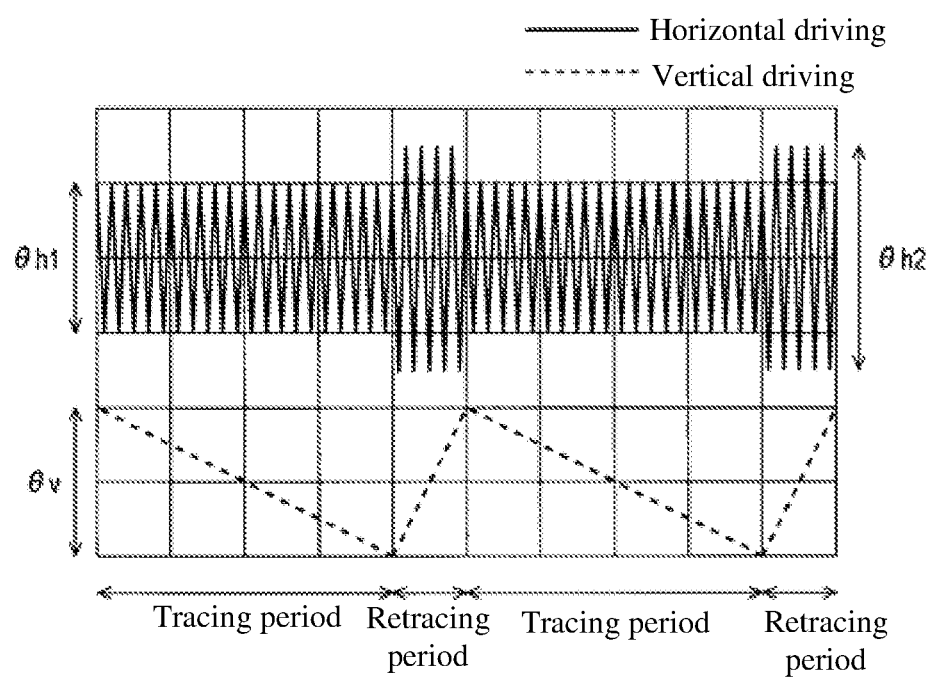
FIG. 6B is a graph illustrating horizontal driving and vertical driving of the mirror portion according to the first embodiment of the present invention.

FIG. 6A is a conceptual diagram illustrating reciprocating scanning of the laser lights 300 in an example of the first embodiment of the present invention. Moreover, FIG. 6B is a graph illustrating horizontal driving and vertical driving of the mirror portion 331 in the example of the first embodiment of the present invention.

As illustrated in FIG. 6A, in the example, scanning of the laser lights 300 in the tracing period starts from a position in a top-left corner of the display region 112 and ends in a position in a bottom-left corner of the display region 112. Moreover, as illustrated in FIG. 6B, with the mirror portion 331, the angle range θv of swinging in the vertical direction Y is constant in both the tracing period and the retracing period but the angle range θh of swinging in the horizontal direction X is different between the tracing period and the retracing period.

In the tracing period of the example, the biaxial MEMS mirror device 33 performs scanning in the horizontal direction X in an angle range θh1 during outbound scanning in the vertical direction Y (for example, scanning downward in FIG. 6A) and the mirror portion 331 is tilted downward in the vertical direction Y in the angle range θv. In this manner, the light controller 62 outputs the laser lights 300 from the LDs 11a to 11c in a situation where an outbound operation of the mirror portion 331 in the vertical direction Y is performed. The biaxial MEMS mirror device 33 causes the mirror portion 331 to perform the reciprocating operation in the angle range θh1, wherein the light spot (projection position) of the laser lights 300 on the projection surface 111 is scanned in the horizontal direction X in the display region 112. Therefore, the laser lights 300 projected from the mirror portion 331 are not projected to the light-blocking regions 113 but are projected to the display region 112 and reciprocatingly scanned in a zigzag downward in the vertical direction Y. That is, the tracing period can be allocated without waste as a period of forming the image.

Furthermore, in the retracing period of the example, the biaxial MEMS mirror device 33 performs scanning in the horizontal direction X in an angle range θh2 during inbound scanning in the vertical direction Y (for example, scanning upward in FIG. 6A) and the mirror portion 331 is tilted upward in the vertical direction Y in the angle range θv. In this manner, in a situation where an inbound operation of the mirror portion 311 in the vertical direction Y is performed, the biaxial MEMS mirror device 33 further causes to be performed a reciprocating operation of the mirror portion 311 in the angle range θh2 in the horizontal direction X. This angle range θh2 is wider than the angle range θh1 in the tracing period and narrower than an angle range in a situation where the virtual light spot is scanned across an entirety of the projection surface 111 in the horizontal direction X. The light controller 62 outputs the laser lights 300 from the LDs 11a to 11c when tilting of the mirror portion 311 is performed outside of the angle range θh1 and inside the angle range θh2 in the horizontal direction X. Moreover, with the light controller 62, the acquisition unit 63 acquires the light output characteristics of the LDs 11a to 11c based on each light output signal output to the LDs 11a to 11c and the detection results of the OEICs 26a, 26b.

Specifically, in the retracing period, the laser lights 300 are not output from the LDs 11a to 11c other than in a situation where the light output characteristics of the LDs 11a to 11c are acquired. Because of this, as in the dash-dot line in FIG. 6A, the virtual light spot is reciprocatingly scanned in a zigzag upward in the vertical direction Y on the projection surface 111, which includes the light-blocking regions 113. That is, the virtual light spot returns from a scanning final position in the tracing period (bottom-left corner in the display region 112 in FIG. 6A) to a scanning final position (top-left corner in the display region 112 in FIG. 6A).

Furthermore, in the retracing period, in the situation where the virtual light spot is in a light-blocking region 113, each LD 11a to 11c is illuminated in order at the predetermined light outputs and the light output characteristics are acquired by the acquisition unit 63. For example, in FIG. 6A, when the virtual light spot is positioned in the regions 113a to 113c, the light output characteristics of the LDs 11a to 11c are respectively acquired. That is, the light controller 62 causes the LD 11a to be illuminated at the predetermined light quantity when the virtual light spot is positioned in the region 113a. The acquisition unit 63 acquires the light output characteristics of the LD 11a based on the light output control signal output to the LD 11a and sensing results at the OEICs 26a, 26b. The light output characteristics of the LDs 11b, 11c are acquired similarly. Therefore, description thereof is omitted.

As described above, in the example, the laser lights 300 are not projected to the light-blocking regions 113 in the tracing period. Because of this, compared to the comparative example, where the laser lights 300 are projected to the light-blocking regions 113, a drawing efficiency of the image formed in the display region 112 wherein scanning in the horizontal direction X on the projection surface 111 is performed in the angle range θh1 can be greatly improved. Moreover, because the laser lights 300 can be continuously scanned in the display region 112, a decrease in a perceived brightness of the image formed in the display region 112 can be prevented.

According to the first embodiment of the present invention, the projector unit 1 (light-projecting device) includes the LDs 11a to 11c (light source) that emit the laser lights 300; the OEICs 26a, 26b (first light-receiving IC) that detect the light quantities of the laser lights 300 emitted from the LDs 11a to 11c; the light controller 62 (controller) that controls the LDs 11a to 11c based on the detection results of the OEICs 26a, 26b; and the biaxial MEMS mirror device 33 (scanner) that performs scanning in the vertical direction Y (first scan) of the laser lights 300 and scanning in the horizontal direction X (second scan) that is orthogonal to the scanning in the vertical direction Y by swinging in the predetermined angles. The biaxial MEMS mirror device 33 performs scanning in the horizontal direction X (second scan) in the angle range θh1 (first angle range) in a first direction of scanning in the vertical direction Y (first scan) and performs scanning in the horizontal direction X (second scan) in the angle range θh2 (second angle range) that is greater than the angle range θh1 (first angle range) in a second direction that is an opposite direction of the first direction in scanning in the vertical direction Y (first scan).

In the first embodiments of the present invention, the projector unit 1 (light-projecting device) includes the LD 11 (light source) that emits a light, and the biaxial MEMS mirror device 33 (scanner) that performs the scan of the vertical direction Y (first scan) of the light in a first direction and a second direction opposed to the first direction, and performs the horizontal direction X (second scan) of the light in a direction orthogonal to the first direction. The biaxial MEMS mirror device 33 performs the scan of the horizontal direction X while the biaxial MEMS mirror device 33 is swinging in the angle range θh1 (first angle range) when the biaxial MEMS mirror device 33 performs the scan of the vertical direction Y in the first direction. The biaxial MEMS mirror device 33 performs the scan of the horizontal direction X (second scan) while the biaxial MEMS mirror device 33 is swinging in the angle range θh2 (second angle range) that is greater than the angle range θh1 range when the biaxial MEMS mirror device 33 performs the scan of the vertical direction Y in the second direction.

Furthermore, the first direction in scanning in the vertical direction Y (first scan) is outbound (in scanning in the vertical direction Y). The second direction in scanning in the vertical direction Y (first scan) is inbound (in scanning in the vertical direction Y).

By this, scanning in the horizontal direction X (second scan) in the second direction (inbound) of scanning in the vertical direction Y (first scan) is performed in the angle range θh2 (second angle range) that is greater than the angle range θh1 (first angle range) in the first direction (outbound) in scanning in the vertical direction Y (first scan). Therefore, if the image is formed on the projection surface 111 by scanning in the horizontal direction X (second scan) in the first direction (outbound) in scanning in the vertical direction Y (first scan) and the light quantities of the laser lights 300 output from the LDs 11a to 11c (light source) are detected when scanning in the horizontal direction X (second scan) is performed in an angle greater than the angle range θh1 and no more than the angle range θh2 in the second direction (inbound) in scanning in the vertical direction Y (first scan), the light quantities of the laser lights 300 output from the LDs 11a to 11c can be detected without decreasing the drawing efficiency of the image formed on the projection surface 111 or affecting the image with noise or the like. Moreover, the light output characteristics of the LDs 11a to 11c can be acquired using the detected light quantities. Therefore, the projector unit 1 can acquire the light output characteristics of the LDs 11a to 11c while suppressing or preventing a decrease in the drawing efficiency.

Furthermore, the projector unit 1 further includes the light-blocking frame 34 (light-blocking frame) that blocks the laser lights 300 projected outside the display region 112 wherein scanning in the horizontal direction X (second scan) on the projection surface 111 is performed in the angle range θh1 (first angle range).

By this, projection of the laser lights 300 outside the display region 112 wherein the image is formed on the projection surface 111 can be reliably prevented by the light-blocking frame 34 (light-blocking frame). Therefore, an adverse effect on the image formed on the projection surface 111 can be reliability prevented and the image can be displayed more suitably.

(Second Embodiment)

In a second embodiment of the present invention, in the retracing period, after swinging in the horizontal direction X of the mirror portion 311 is performed in the angle range θh2, the range θh of swinging in the horizontal direction X is gradually decreased from the angle range θh2 to the angle range θh1. Described below are configurations different from those of the first embodiment of the present invention. Moreover, components similar to those of the first embodiment of the present invention are labeled with the same reference signs and description thereof is omitted.

Figure 7:
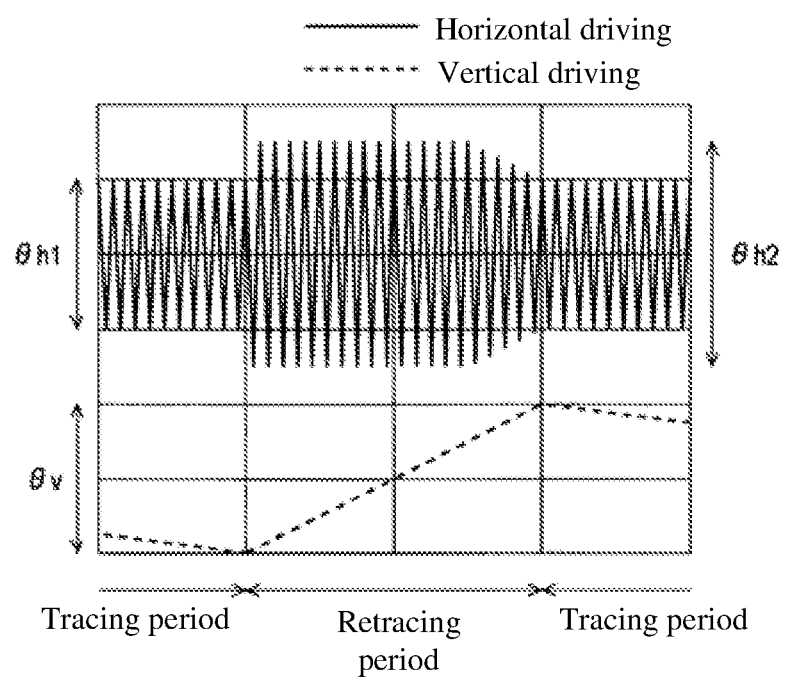
FIG. 7 is a graph illustrating horizontal driving and vertical driving of the mirror portion according to a second embodiment of the present invention.

The biaxial MEMS mirror device 33 decreases scanning in the vertical direction Y from the angle range θh2 to the angle range θh1 during inbound scanning in the vertical direction Y. FIG. 7 is a graph illustrating horizontal driving and vertical driving of the mirror portion 331 in the second embodiment of the present invention. As illustrated in FIG. 7, in the retracing period, in a situation where the inbound operation of the mirror portion 311 in the vertical direction Y (that is, tilting upward in the vertical direction Y) is performed, the biaxial MEMS mirror device 33 first causes to be performed the reciprocating operation of the mirror portion 331 in the horizontal direction X in the angle range θh2. Afterward, at a point before a predetermined time of moving to the tracing period, the biaxial MEMS mirror device 33 continuously and gradually decreases the range θh wherein the reciprocating operation of the mirror portion 331 is performed in the horizontal direction X from the angle range θh2 to the angle range θh1. Then, in the tracing period, the mirror portion 331 is tilted downward in the vertical direction Y and swings in the angle range θh1 in the horizontal direction X.

In the second embodiment of the present invention, as in FIG. 7, a point in the retracing period when the range θh wherein the reciprocating operation of the mirror portion 331 in the horizontal direction X is performed becomes the angle range θh1 is made to be the same point as starting the retracing period but one or more embodiments of the present invention is not limited to this example. For example, the point of becoming the angle range θh1 may be a point before the tracing period starts. That is, in the retracing period, after the range θh of swinging in the horizontal direction X of the mirror portion 311 is continuously and gradually decreased from the angle range θh2 to the angle range θh1, there may be a period where the reciprocating operation of the mirror portion 311 in the horizontal direction X is performed in the angle range θh1.

According to the second embodiment of the present invention, the biaxial MEMS mirror device 33 (scanner) decreases scanning in the horizontal direction X (second scan) from the angle range θh2 (second angle range) to the angle range θh1 (first angle range) in the second direction in scanning in the vertical direction Y (first scan). Thus, the biaxial MEMS mirror device 33 (scanner) causes the second angle range the angle range θh2 (second angle range) to be gradually close to the angle range θh1 (first angle range) during the scan in the vertical direction Y (first scan) in the second direction By this, a scanning-angle range of scanning in the horizontal direction X (second scan) is decreased to the angle range θh1 (first angle range) before scanning in the vertical direction Y (first scan) changes from being inbound (second direction) to outbound (first direction). Therefore, even if scanning in the horizontal direction X (second scan) is being performed at high speed, the range wherein scanning in the horizontal direction X (second scan) is performed can be stably decreased with no anomalies. Therefore, the image formed on the projection surface 111 can be optimally displayed without being disturbed.

(Third Embodiment)

In a third embodiment of the present invention, in the retracing period, after the range θh wherein the mirror portion 311 swings in the horizontal direction X gradually increases from the angle range θh1 to the angle range θh2, swinging in the horizontal direction X is performed in the angle range θh2. Described below are configurations different from those of the first and second embodiments of the present invention. Moreover, components similar to those of the first and second embodiments of the present invention are labeled with the same reference signs and description thereof is omitted.

Figure 8:
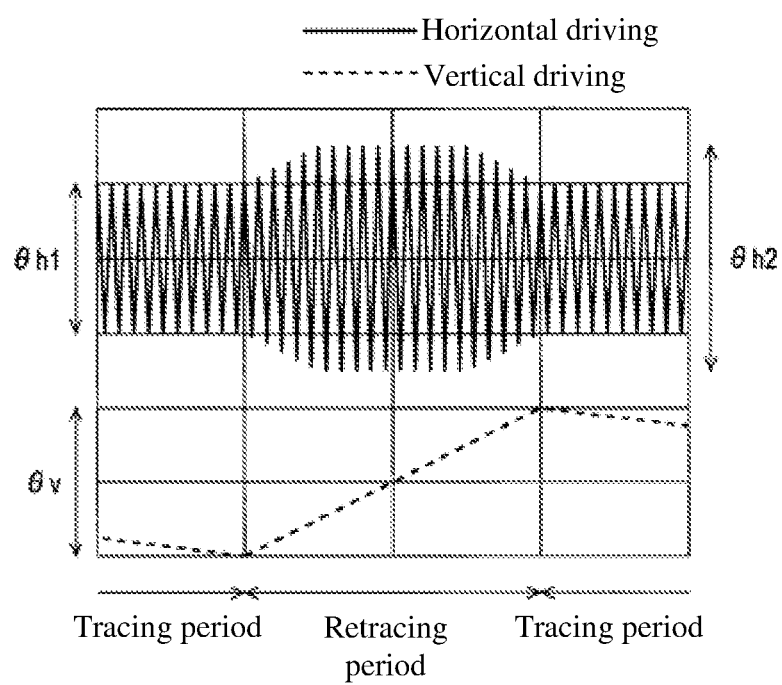
FIG. 8 is a graph illustrating horizontal driving and vertical driving of the mirror portion according to a third embodiment of the present invention.

FIG. 8 is a graph illustrating horizontal driving and vertical driving of the mirror portion 331 according to the third embodiment of the present invention. As illustrated in FIG. 8, in the retracing period, in the situation where the inbound operation of the mirror portion 311 in the vertical direction Y (that is, tilting upward in the vertical direction Y) is performed, the biaxial MEMS mirror device 33 first continuously and gradually increases the range θh wherein the reciprocating operation of the mirror portion 331 is performed in the horizontal direction X from the angle range θh1 to the angle range θh2. Afterward, the biaxial MEMS mirror device 33 causes the reciprocating operation of the mirror portion 331 in the horizontal direction X to be performed in the angle range θh2. Thus, the biaxial MEMS mirror device 33 causes the angle range θh1 (first angle range) to be gradually close to the angle range θh2 (second angle range) during the first scan in the first direction.

A range wherein the mirror portion 331 swings in the horizontal direction X when moving from the retracing period to the tracing period may be different from FIG. 8 and immediately made to be the angle range θh1 but is continuously and gradually decreased from the angle range θh2 to the angle range θh1 before moving from the retracing period to the tracing period as in FIG. 8. By this, the reciprocating operation of the mirror portion 331 in the horizontal direction X can be further stabilized.

Furthermore, in the third embodiment of the present invention, as in FIG. 8, a point in the retracing period when the range θh wherein the reciprocating operation of the mirror portion 331 in the horizontal direction X is performed starts to increase toward the angle range θh2 is made to be the same point as starting the retracing period but one or more embodiments of the present invention is not limited to this example. For example, the point of starting to increase toward the angle range θh2 may be after the point when the retracing period is started. That is, in the retracing period, there may be a period where the reciprocating operation of the mirror portion 311 in the horizontal direction X is performed in the angle range θh1 before the range θh of swinging in the horizontal direction X of the mirror portion 311 is continuously and gradually increased from the angle range θh1 to the angle range θh2.

According to the third embodiment of the present invention, after the operation of the mirror portion 331 in the vertical direction Y changes from being outbound to inbound, the range θh wherein the reciprocating operation of the mirror portion 331 is performed in the horizontal direction X can be gradually increased. Therefore, even if the reciprocating operation of the mirror portion 331 is being performed at high speed, the range θh wherein the reciprocating operation is performed can be stably increased with no anomalies and the image formed in the display region 112 can be optimally displayed without being disturbed.

(Fourth Embodiment)

According to a fourth embodiment of the present invention, an operation input indicating a size in the horizontal direction X of an image-forming region 114 wherein the image is formed on the projection surface 111 is accepted by the input unit 56. Moreover, the size in the horizontal direction X of the region 114 wherein the image is formed on the projection surface 111 is decreased according to the accepted operation input and is made smaller than a size in the horizontal direction X of the display region 112. Described below are configurations different from those of the first to third embodiments of the present invention. Moreover, components similar to those of the first to third embodiments of the present invention are labeled with the same reference signs and description thereof is omitted.

Figure 9A:
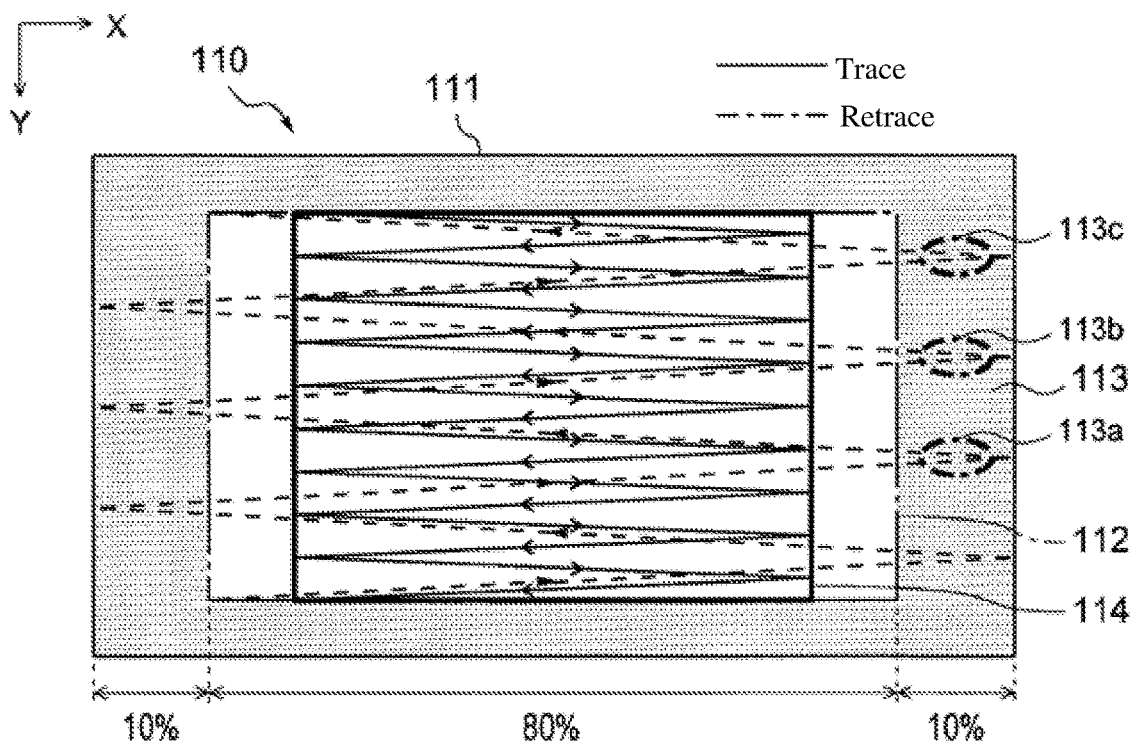
FIG. 9A is a conceptual diagram illustrating reciprocating scanning of the laser lights according to a fourth embodiment of the present invention.
Figure 9B:
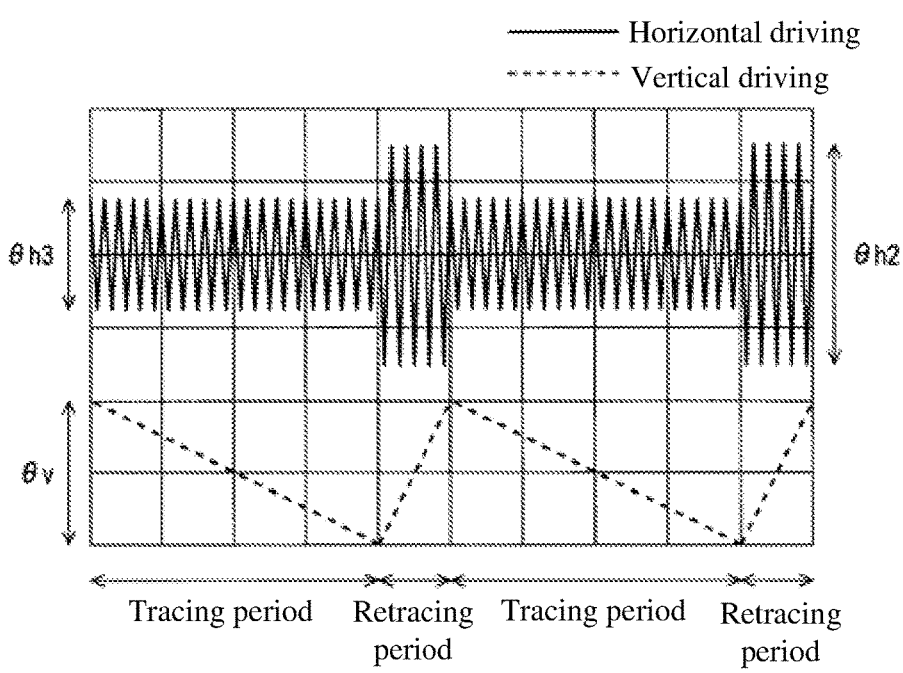
FIG. 9B is a graph illustrating horizontal driving and vertical driving of the mirror portion according to the fourth embodiment of the present invention.

The biaxial MEMS mirror device 33 performs scanning in the horizontal direction X in an angle range θh3 that is narrower than the angle range θh1. The angle range θh3 is determined based on the operation input accepted at the input unit 56. FIG. 9A is a conceptual diagram illustrating reciprocating scanning of the laser lights 300 in the fourth embodiment of the present invention. Moreover, FIG. 9B is a graph illustrating horizontal driving and vertical driving of the mirror portion 331 in the fourth embodiment of the present invention.

When the operation input indicating the size in the horizontal direction X of the image-forming region 114 wherein the image is formed on the input-unit projection surface 111 that accepts the operation input is accepted by the input unit 56, as in FIG. 9A, the image-forming region 114 is established in the display region 112 according to this operation input. Scanning of the laser lights 300 in the tracing period starts in a position in a top-left corner of the image-forming region 114 and ends in a position in a bottom-left corner of the image-forming region 114. Moreover, as illustrated in FIG. 9B, with the mirror portion 331, the angle range θv of swinging in the vertical direction Y is constant in both the tracing period and the retracing period but the angle range θh of swinging in the horizontal direction X is different between the tracing period and the retracing period.

Specifically, in the tracing period, the light controller 62 outputs the laser lights 300 from the LDs 11a to 11c in a situation where the outbound operation of the mirror portion 331 in the vertical direction Y is performed. The biaxial MEMS mirror device 33 causes the reciprocating operation of the mirror portion 331 in the horizontal direction X to be performed in the angle range θh3 that is narrower than the angle range θh1. By the mirror portion 331 performing the reciprocating operation in the horizontal direction X in the angle range θh3, as in FIG. 9A, the light spot (projection position) of the laser lights 300 on the projection surface 111 is scanned in the horizontal direction X in the image-forming region 114. Therefore, the laser lights 300 projected from the mirror portion 331 are not projected to the light-blocking regions 113 but are projected to the image-forming region 114 in the display region 112 and reciprocatingly scanned in a zigzag downward in the vertical direction Y. Therefore, the image can be formed in the image-forming region 114 whose size in the horizontal direction X is decreased according to the operation input.

In the fourth embodiment of the present invention, the biaxial MEMS mirror device 33 (scanner) performs scanning in the horizontal direction X (second scan) in the angle range θh3 (third angle range) that is smaller than the angle range θh1 (first angle range).

By this, the size in scanning in the horizontal direction X (second scan) of the image formed on the projection surface 111 can be decreased.

Furthermore, the projector unit 1 further includes the input unit 56 that accepts the input. The angle range θh3 (third angle range) is determined based on the input.

By this, the size in scanning in the horizontal direction X (second scan) of the image formed on the projection surface 111 can be decreased to a size according to the input.

(Fifth Embodiment)

In a fifth embodiment of the present invention, the angle range θh wherein the mirror portion 331 swings in the horizontal direction X gradually increases from the angle range θh1 after the retracing period starts and gradually decreases to the angle range θh1 before the retracing period ends.

Moreover, the light output characteristics of the LDs 11a to 11c are acquired when the angle range θh is no more than a threshold angle range θhs in the retracing period. Described below are configurations different from those of the first to fourth embodiments of the present invention. Moreover, components similar to those of the first to fourth embodiments of the present invention are labeled with the same reference signs and description thereof is omitted.

Figure 10A:
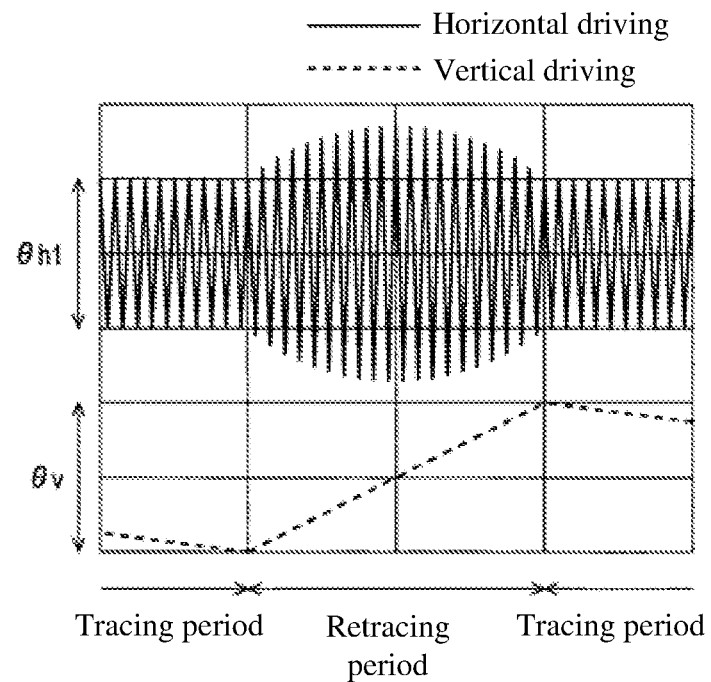
FIG. 10A is a graph illustrating horizontal driving and vertical driving of the mirror portion according to a fifth embodiment of the present invention.
Figure 10B:
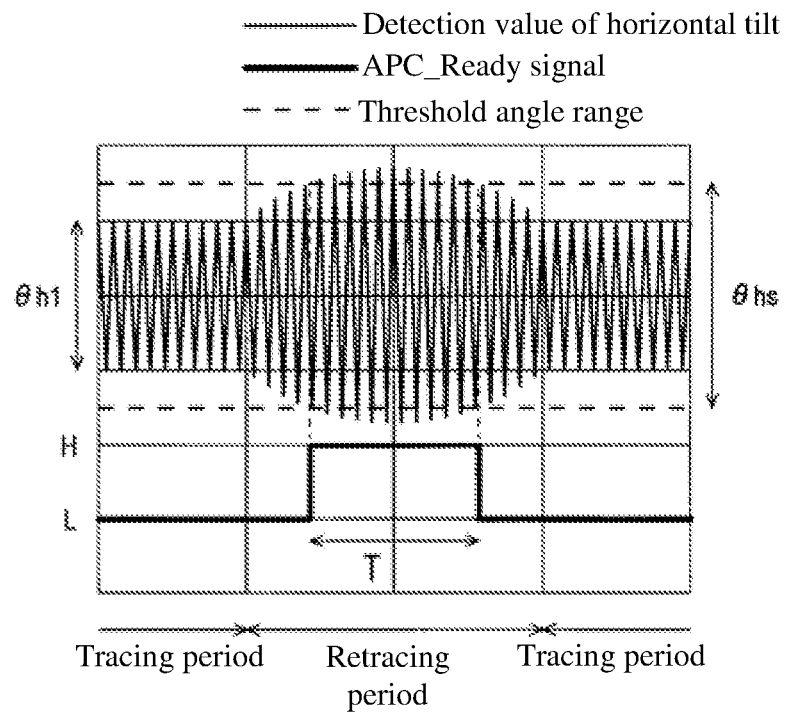
FIG. 10B is a diagram illustrating a detection result of an angle range of swinging in a horizontal direction of the mirror portion according to the fifth embodiment of the present invention.

FIG. 10A is a graph illustrating horizontal driving and vertical driving of the mirror portion 331 in the fifth embodiment of the present invention. FIG. 10B is a diagram illustrating a detection result of the angle range θh of swinging in the horizontal direction X of the mirror portion 331 in the fifth embodiment of the present invention.

As illustrated in FIG. 10A, when the retracing period starts, the biaxial MEMS mirror device 33 continuously and gradually increases the angle range θh wherein the reciprocating operation of the mirror portion 331 in the horizontal direction X is performed from the angle range θh1. Moreover, at a point before the predetermined time of moving from the retracing period to the tracing period, the biaxial MEMS mirror device 33 continuously and gradually decreases the angle range θh to the angle range θh1.

The MEMS mirror driver 52 detects in real time the angle range θh wherein the mirror portion 331 actually swings in the horizontal direction X. Note that a detection method of the angle range θh is not particularly limited. For example, in a situation where the biaxial MEMS mirror device 33 is swinging the mirror portion 331 using a piezoelectric actuator, the MEMS mirror driver 52 can detect the angle range θh from a piezoelectric signal. Moreover, in a situation where the biaxial MEMS mirror device 33 is swinging the mirror portion 331 using an electrostatic actuator, the MEMS mirror driver 52 can detect the angle range θh by measuring a change in capacitance between the mirror portion 331 and a detection electrode provided to a substrate of the biaxial MEMS mirror device 33.

The controller 60 generates an APC_Ready signal based on the above detection result of the MEMS mirror driver 52 (that is, a detection value of the angle range θh). The APC_Ready signal indicates whether the detection value of the angle range θh is no less than the threshold angle range θhs, which is predetermined. Moreover, the threshold range θhs is wider than the angle range θh1 wherein the light spot of the laser lights 300 is scanned in the display region 112 on the projection surface 111 in the horizontal direction X and narrower than the angle range in the situation where the virtual light spot is scanned across the entirety of the projection surface 111 in the horizontal direction X. As illustrated in FIG. 10B, the APC_Ready signal is at an H level if the detection value of the angle range θh is no less than the threshold angle range θh and is at an L level if the detection value of the angle range θh is less than the threshold angle range θhs.

The OEICs 26a, 26b detect the light quantities of the laser lights 300 based on the angle range θh being no less than the threshold angle range θhs. The acquisition unit 63 acquires the respective light output characteristics of the LDs 11a to 11c when the angle range θh wherein the mirror portion 331 actually swings in the horizontal direction X in the retracing period is no less than the threshold angle range θhs. Specifically, the acquisition unit 63 determines whether the APC_Ready signal is at the H level or the L level so as to confirm that in the retracing period the projection direction of the laser lights 300 by the mirror portion 331 is directed to the light-blocking regions 113 outside the display region 112. Moreover, the acquisition unit 63 acquires the respective light output characteristics of the LDs 11a to 11c in a period T (see FIG. 10B) when the APC_Ready signal is at the H level and does not acquire the light output characteristics in a period when the APC_Ready signal is at the L level.

In the fifth embodiment of the present invention, the OEICs 26a, 26b (first light-receiving IC) detect the light quantities of the laser lights 300 based on the angle range θh (second angle range) being no less than the threshold angle range θhs (threshold angle range).

By this, the light quantities of the laser lights 300 output from the LDs 11a to 11c can be detected when scanning in the horizontal direction X (second scan) is performed at an angle no less than the threshold angle range θhs (threshold angle range). Therefore, by this, the light quantities of the laser lights 300 output from the LDs 11a to 11c can be detected without affecting the image formed on the projection surface 111 with noise or the like. Moreover, the light output characteristics of the LDs 11a to 11c can be acquired using the detected light quantities. Therefore, an adverse effect caused by the acquisition of the light output characteristics affecting the image formed on the projection surface 111 can be reliably prevented.

(Sixth Embodiment)

In a sixth embodiment of the present invention, in addition to the configuration of the fifth embodiment of the present invention, the threshold angle range θhs is set to an angle range where the time T when the APC_Ready signal is at the H level is longer than a predetermined lower-limit time TL and no more than a predetermined upper-limit time T2. Described below are configurations different from those of the fifth embodiment of the present invention. Moreover, components similar to those of the first to fifth embodiments of the present invention are labeled with the same reference signs and description thereof is omitted.

Figure 11:
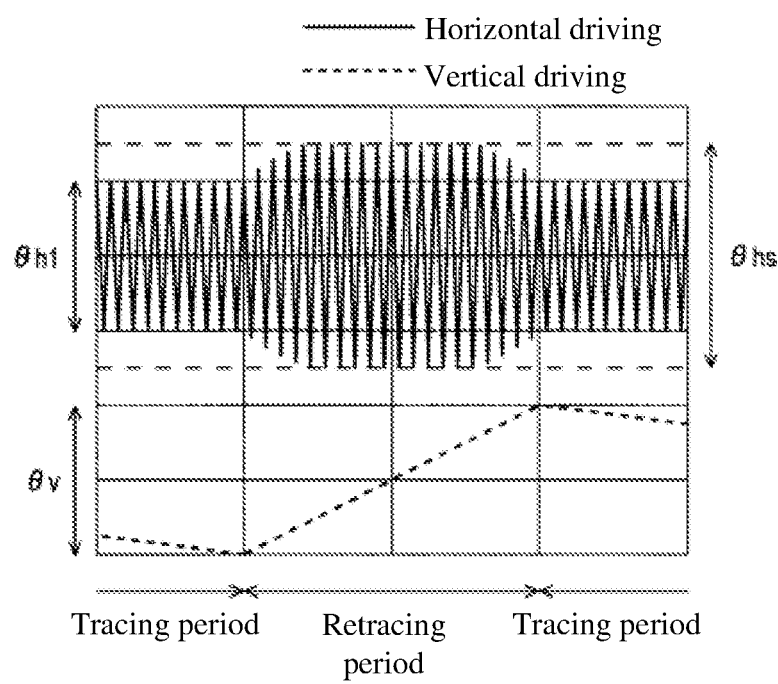
FIG. 11 is a graph illustrating horizontal driving and vertical driving of the mirror portion according to a sixth embodiment of the present invention.

FIG. 11 is a graph illustrating horizontal driving and vertical driving of the mirror portion 331 in the sixth embodiment of the present invention. When the retracing period starts, the biaxial MEMS mirror device 33 continuously and gradually increases the angle range θh wherein the reciprocating operation of the mirror portion 331 in the horizontal direction X is performed from the angle range θh1. Afterward, moreover, at a point before the predetermined time of moving from the retracing period to the tracing period, the biaxial MEMS mirror device 33 continuously and gradually decreases the angle range θh to the angle range θh1. Note that from a point when the angle range θh reaches the threshold angle range θhs to a point before the predetermined time of moving to the tracing period, as in FIG. 11, the angle range θh may be made to be identical to the threshold angle range θhs.

Furthermore, the MEMS mirror driver 52 detects in real time the angle range θh wherein the mirror portion 331 actually swings in the horizontal direction X (see FIG. 10B). The acquisition unit 63 acquires the respective light output characteristics of the LDs 11a to 11c in a period when the detected angle range θh is no less than the threshold angle range θhs.

Furthermore, the controller 60 sets again the threshold angle range θhs based on a detection result of the angle range θh in the retracing period (particularly, a temporal change in the angle range θh). Specifically, an angle θh where the time T when the detected angle range θh exceeds the threshold angle range θhs becomes a set time Ts that is no less than the predetermined lower-limit time TL and no more than a predetermined upper-limit time TH is set as the threshold angle range θhs. The lower-limit time TL is longer than a time required to swing the mirror portion 331 in the horizontal direction X in the angle range θh1. Moreover, the upper-limit time TH is longer than the lower-limit time TL and shorter than the retracing period. Then, in the next retracing period, based on the threshold angle range θhs that is set again, the light output characteristics of the LDs 11a to 11c are acquired when θh≤θhs.

In the sixth embodiment of the present invention, the threshold angle range θhs (threshold angle range) is made to be an angle where the time T when the angle range θh (second angle range) becomes no less than the threshold angle range θhs is longer than the lower-limit time TL (first time) and no more than the upper-limit time TH (second time).

By this, the light quantities of the laser lights 300 output from the LDs 11a to 11c can be detected in a period that is longer than the lower-limit time TL (first time) and no more than the upper-limit time TH (second time). Moreover, the light output characteristics of the LDs 11a to 11c can be acquired using the detected light quantities. Therefore, a period can be ensured of acquiring the light output characteristics of the LDs 11a to 11c without adversely affecting the display of the image.

(Seventh Embodiment)

In a seventh embodiment of the present invention, two light sensors 120a, 120b are provided on a light-blocking surface 342 of the light-blocking frame 34. The light sensor 120a detects a laser light 300 projected from the mirror portion 331 when the retracing period starts, and the light sensor 120b detects a laser light 300 projected from the mirror portion 331 before the retracing period ends. Described below are configurations different from those of the first to sixth embodiments of the present invention. Moreover, components similar to those of the first to sixth embodiments of the present invention are labeled with the same reference signs and description thereof is omitted.

Figure 12:
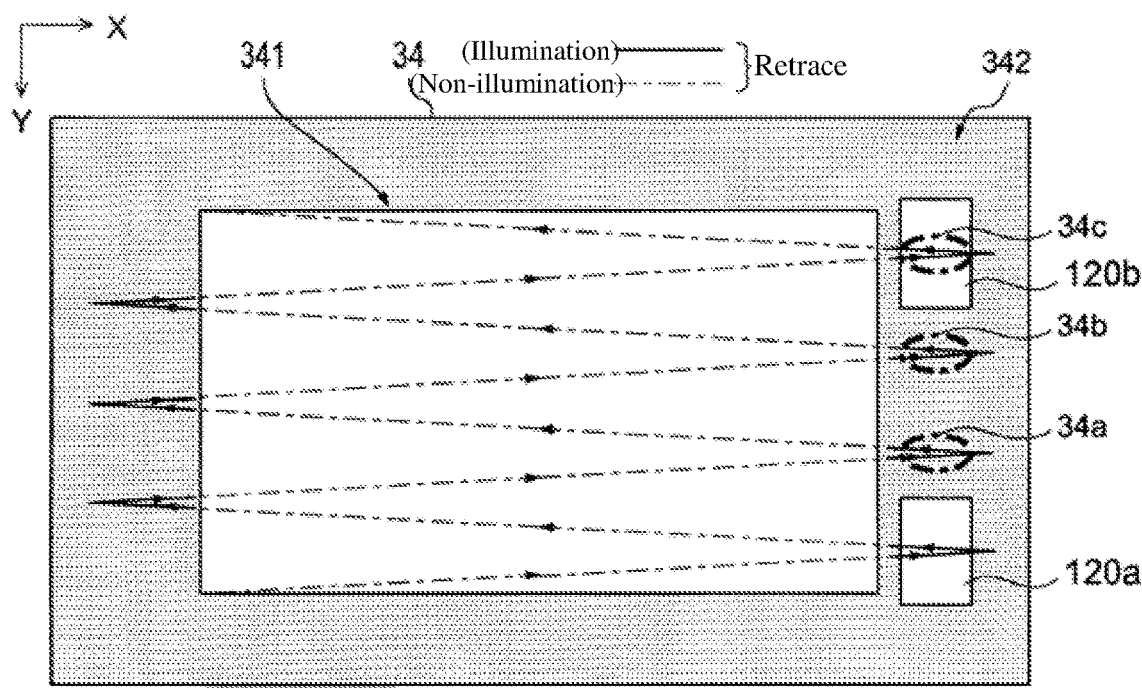
FIG. 12 is a plan view viewing a light-blocking frame from the mirror portion according to a seventh embodiment of the present invention.

FIG. 12 is a plan view viewing the light-blocking frame 34 from the mirror portion 331 in the seventh embodiment of the present invention. In FIG. 12, the solid line illustrates a trajectory of the laser lights 300 projected from the mirror portion 331 to the light-blocking surface 342 in the retracing period. Moreover, the dash-dot line illustrates a trajectory of the virtual light spot of the laser lights 300 that would be scanned in the situation where it is supposed that the laser lights 300 are projected from the mirror portion 331 to the projection surface 111 in the retracing period.

In the retracing period, the laser lights 300 are output from the LDs 11a to 11c as illustrated by the solid line in FIG. 12 in a period of being projected to the light-blocking surface 342 but are not output in a period of not being projected to the light-blocking surface 342 as illustrated by the dash-dot line in FIG. 12.

The projector unit 1 further includes the two light sensors 120a, 120b. As illustrated in FIG. 12, the two light sensors 120a, 120b are light-detecting elements disposed on the light-blocking surface 342, which faces the biaxial MEMS mirror device 33, of the light-blocking frame 34, and detect a laser light 112 projected outside the display region 112. The light sensor 120a is disposed in a position on the light-blocking surface 342 where the laser lights 300 projected from the mirror portion 331 to the light-blocking regions 113 of the projection surface 111 when the retracing period starts are projected to the light-blocking surface 342 of the light-blocking frame 34. The light sensor 120b is disposed in a position on the light-blocking surface 342 where the laser lights 300 projected from the mirror portion 331 to the light-blocking regions 113 before the retracing period ends are projected to the light-blocking surface 342. In this manner, the light sensor 120b detects laser lights 300 projected to a different position with regard to the light sensor 120a. The light sensors 120a, 120b output detection results to the controller 60.

The controller 60 recognizes the start of the retracing period by detecting the laser lights 300 by the light sensor 120a and recognizes the end of the retracing period by detecting the laser lights 300 by the light sensor 120b. Then, in a period between recognizing the start of the retracing period and recognizing the end of the retracing period, in a situation where the laser lights 300 are being projected from the mirror portion 331 to the light-blocking surface 342, the light controller 62 causes the LDs 11a to 11c to individually be illuminated at the predetermined light outputs. Then, the light controller 62 detects the light quantities of the laser lights 300 of each color in a period between detecting the laser lights 300 by the light sensor 120a and detecting the laser lights 300 by the light sensor 120b. The acquisition unit 63 acquires the respective light output characteristics of the LDs 11a to 11c in the period above. For example, in FIG. 12, the light output characteristics of the LDs 11a to 11c are respectively acquired when the laser lights 300 are projected to regions 34a to 34c on the light-blocking surface 342. That is, the light controller 62 causes the LD 11a to be illuminated at the predetermined light quantity when the laser lights 300 are projected to the region 34a. The acquisition unit 63 acquires the light output characteristics of the LD 11a based on the light output control signal output to the LD 11a and the sensing results at the OEICs 26a, 26b. Moreover, the light output characteristics of the LDs 11b, 11c are acquired similarly. Therefore, description thereof is omitted.

In the seventh embodiment of the present invention, the projector unit 1 further includes the light sensor 120a (second light-receiving IC) and the light sensor 120b (third light-receiving IC) that detect the laser lights 300 projected outside the display region 112 wherein scanning in the horizontal direction X (second scan) is performed in the angle range θh1 (first angle range) on the projection surface 111. The light sensor 120b detects laser lights 300 projected to a different position with regard to the light sensor 120a. The light controller 62 detects the light quantities of the laser lights 300 in the period between detecting the laser lights 300 by the light sensor 120a and detecting the laser lights 300 by the light sensor 120b third light-receiving IC.

By this, it can be sensed that it is a period when inbound scanning in the vertical direction Y (scanning in the second direction in the first scan) is being performed and the light quantities of the laser lights 300 output from the LDs 11a to 11c can be detected in this period. Moreover, the light output characteristics of the LDs 11a to 11c can be acquired using the detected light quantities. Therefore, an adverse effect caused by the acquisition of the light output characteristics affecting the image formed on the projection surface 111 can be more reliably prevented.

Furthermore, the projector unit 1 further includes the light-blocking frame 34 (light-blocking frame) that blocks the laser lights 300 projected outside the display region 112 wherein scanning in the horizontal direction X (second scan) is performed in the angle range θh1 (first angle range) on the projection surface 111. The light sensor 120a (second light-receiving IC) and the light sensor 120b (third light-receiving IC) are each a light-detecting element provided to the light-blocking frame 34.

By this, projection of the laser lights 300 outside the display region 112 wherein the image is formed on the projection surface 111 can be reliably prevented by the light-blocking frame 34 (light-blocking frame). Moreover, it can be reliably sensed that it is the period when inbound scanning in the vertical direction Y (scanning in the second direction in the first scan) is being performed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, in the first to seventh embodiments of the present invention, the HUD device 100 may be of a configuration of being provided with the projector unit 1 and displaying the image on the inner surface of the windshield 201 by the scanning laser lights 300. That is, the HUD device 100 does not have to be provided with the combiner 110 and the inner surface of the windshield 201 may be used as the projection surface 111.

Furthermore, the first to seventh embodiments of the present invention described above can be worked in combination as long as no contradiction arises in particular.

100 Head-up display device (HUD device)
110 Combiner
111 Projection surface
112 Display region
113 Light-blocking region
114 Image-forming region
120a, 120b Light sensor
200 Vehicle
201 Windshield
300 Laser light
400 Line of sight of user
1 Projector unit
10 Light-source module
11a to 11c Laser diode (LD)
12a to 12c Collimating lens
13 Light-synthesizing member
13a, 13b Beam splitter
14 Prism
20 Dimming attenuator
21a, 21b, 21c Polarizing filter
22a, 22b Half-mirror
23 Liquid-crystal element
24 Half-wave plate
25a, 25b Light-quantity filter
26a, 26b OEIC
30 MEMS unit
31 Condensing lens
32a, 32b Mirror
33 Biaxial MEMS mirror device
331 Mirror portion (Light-reflector)
34 Light-blocking frame
341 Opening
342 Light-blocking surface
40 Optical-system housing
41 Opening
50 Main-body housing
51 Light emission port
52 MEMS mirror driver
53 LD driver
54 Power-supply unit
55 Power-supply controller
56 Input unit
57 Input/output I/F
58 Storage unit
60 Controller
61 Image processing unit
62 Light controller
63 Acquisition unit
64 Timer

What is claimed is:
1. A light-projecting device, comprising:
a light source that emits a light; and
a first light-receiving Integrated Circuit (IC) that detects a light quantity of the light emitted from the light source;
a controller that controls the light source based on a detection result of the first light-receiving IC,
a scanner that:
 comprises a mirror that reflects the light and swings based on a control signal transmitted from the controller;
 performs a first scan of the light in a first direction and in a second direction opposed to the first direction; and
 performs a second scan of the light in a direction orthogonal to the first direction,
wherein the scanner performs the second scan while the mirror is swinging in a first angle range when the scanner performs the first scan in the first direction,
wherein the scanner performs the second scan while the mirror is swinging in a second angle range that is greater than the first angle range when the scanner performs the first scan in the second direction, and
wherein, while the scanner is performing the first scan in the second direction, the controller:
 causes the light source to emit the light when the scanner performs the second scan at a first swinging angle of the mirror that is inside the second angle range and outside the first angle range, and
 does not cause the light source to emit the light when the scanner performs the second scan at a second swinging angle of the mirror that is inside both the first angle range and the second angle range.

2. The light-projecting device according to claim 1, wherein the first direction in the first scan is outbound and the second direction in the first scan is inbound.

3. The light-projecting device according to claim 1, wherein the scanner causes the second angle range to approach the first angle range during the first scan in the second direction.

4. The light-projecting device according to claim 1, wherein the scanner causes the first angle range to approach the second angle range during the first scan in the first direction.

5. The light-projecting device according claim 1, wherein the first light-receiving IC detects the light quantity when the second angle range is no less than a threshold angle range.

6. The light-projecting device according to claim 5, wherein a time period until the second angle range becomes greater than or equal to the threshold angle range is longer than a first time period and no more than a second time period.

7. The light-projecting device according claim 1,
wherein the light from the mirror is projected toward a projection surface that comprises a display region and a non-display region outside the display region,
wherein the second scan is performed in the first angle range in the display region, and
wherein the non-display region comprises a first region and a second region,
the light-projecting device further comprising:
a second light-receiving IC that detects the light projected to the first region; and
a third light-receiving IC that detects the light projected to the second region,
wherein the controller detects the light quantity in a period from when the second light-receiving IC detects the light until the third light-receiving IC detects the light.

8. The light-projecting device according claim 1, further comprising:
a light-blocking frame that blocks the light projected to a non-display region,
wherein the light from the mirror is projected toward a projection surface that comprises a display region and the non-display region outside the display region, and
wherein the second scan is performed in the first angle range in the display region.

9. The light-projecting device according to claim 7, further comprising:
a light-blocking frame that blocks the light projected to the non-display region,
wherein the light-blocking frame comprises the second light-receiving IC and the third light-receiving IC, and
wherein each of the second light-receiving IC and the third light-receiving IC is a light-detecting element.

10. The light-projecting device according claim 1, wherein the scanner performs the second scan while the scanner is swinging in a third angle range that is smaller than the first angle range.

11. The light-projecting device according to claim 10, further comprising:
an input unit that accepts an input,
wherein the third angle range is determined based on the input.

12. The light-projecting device according to claim 3, wherein the scanner causes the first angle range to approach the second angle range during the first scan in the first direction.

* * * * *